(12) United States Patent
Pike et al.

(10) Patent No.: US 11,042,834 B2
(45) Date of Patent: Jun. 22, 2021

(54) VOICE-ENABLED SUBSTITUTIONS WITH CUSTOMER NOTIFICATION

(71) Applicant: Vocollect, Inc., Pittsburgh, PA (US)

(72) Inventors: Lori Pike, Murrysville, PA (US); James Hendrickson, Ben Avon, PA (US); Vanessa Cassandra Sanchez, Pittsburgh, PA (US); Timothy Reed, Turtle Creek, PA (US); Justin Volz, Verona, PA (US); Brian Quinn, Pittsburgh, PA (US); Stefan Wert, Pittsburgh, PA (US); Joshua Zito, Mars, PA (US); Allan Strane, Greensburg, PA (US); Heather Potts, Pittsburgh, PA (US)

(73) Assignee: Vocollect, Inc., Pittsburgh, PA (US)

( * ) Notice: Subject to any disclaimer, the term of this patent is extended or adjusted under 35 U.S.C. 154(b) by 119 days.

(21) Appl. No.: 15/859,799

(22) Filed: Jan. 2, 2018

(65) Prior Publication Data
US 2018/0197136 A1 Jul. 12, 2018

Related U.S. Application Data

(60) Provisional application No. 62/445,275, filed on Jan. 12, 2017.

(51) Int. Cl.
*G06Q 10/08* (2012.01)
*G10L 15/22* (2006.01)
(Continued)

(52) U.S. Cl.
CPC ........... *G06Q 10/087* (2013.01); *G06F 3/167* (2013.01); *G06Q 10/06315* (2013.01);
(Continued)

(58) Field of Classification Search
CPC ................. G06Q 10/087; G06Q 50/28; G06Q 10/06315; G06F 3/167; G10L 15/30; G10L 15/22; G10L 2015/223
See application file for complete search history.

(56) References Cited

U.S. PATENT DOCUMENTS 6,832,725 B2 12/2004 Gardiner et al.
7,128,266 B2 10/2006 Zhu et al.
(Continued)

FOREIGN PATENT DOCUMENTS

EP 3038029 A1 6/2016
WO 2013163789 A1 11/2013

OTHER PUBLICATIONS

Extended Search Report in related European Application No. 18151536.2 dated Feb. 19, 2018, pp. 1-10.
(Continued)

*Primary Examiner* — Andrew Joseph Rudy
(74) *Attorney, Agent, or Firm* — Alston & Bird LLP

(57) ABSTRACT

A method to provide an order for a user to select goods includes automatically prompting a user via a voice command to collect an item from an order placed by a customer, and in response to receiving the input from an electronic device indicating that the item is unavailable, automatically prompting the user via a voice command to collect a substitute item designated, receiving an input indicating that the substitute item has been collected, followed by electronically notifying the customer that the substitute item has been collected instead of the original item. In another aspect, a voice-enabled click and collect system includes a remote server in communication with a mobile device, configured to prompt a user to collect an item, communicate the item unavailability to the remote server, receive instructions from
(Continued)

the remote server, prompt the user to collect the substitute item, and notify the customer.

20 Claims, 1 Drawing Sheet

(51) Int. Cl.
  *G10L 15/30* (2013.01)
  *G06F 3/16* (2006.01)
  *G06Q 50/28* (2012.01)
  *G06Q 10/06* (2012.01)

(52) U.S. Cl.
  CPC .............. *G06Q 50/28* (2013.01); *G10L 15/22* (2013.01); *G10L 15/30* (2013.01); *G10L 2015/223* (2013.01)

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,751,334 B2 * | 6/2014 | Wijaya ............... G06Q 10/0875 705/26.81 |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |

(56) References Cited

U.S. PATENT DOCUMENTS

| | | |
|---|---|---|
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |

(56) References Cited

U.S. PATENT DOCUMENTS

| | | |
|---|---|---|
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,697,547 B2 * | 7/2017 | Borders ............ G06Q 10/0631 |
| 9,701,140 B1 | 7/2017 | Alaganchetty et al. |
| 10,261,752 B2 * | 4/2019 | Sung .................. G06F 3/04817 |
| 10,346,793 B2 * | 7/2019 | Agarwal ............ G06Q 10/087 |
| 10,346,899 B2 * | 7/2019 | Holman ................... G07F 9/10 |
| 10,445,819 B2 * | 10/2019 | Renfroe ............ G06Q 30/0641 |
| 10,540,632 B2 * | 1/2020 | Putcha ................... G08B 21/18 |
| 10,592,962 B1 * | 3/2020 | Lauka ............ G06K 19/06037 |
| 10,810,530 B2 * | 10/2020 | Geisler ............ G06Q 10/0633 |
| 2007/0063048 A1 | 3/2007 | Havens et al. |
| 2009/0134221 A1 | 5/2009 | Zhu et al. |
| 2009/0240488 A1 * | 9/2009 | White .................... G10L 15/22 704/9 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0095879 A1 * | 4/2012 | Wijaya ............ G06Q 30/0633 705/27.1 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2013/0337789 A1 * | 12/2013 | Johnson ................ H04W 64/00 455/414.1 |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158870 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |

(56) References Cited

U.S. PATENT DOCUMENTS

| | | | |
|---|---|---|---|
| 2014/0263645 A1 | 9/2014 | Smith et al. | |
| 2014/0270196 A1 | 9/2014 | Braho et al. | |
| 2014/0270229 A1 | 9/2014 | Braho | |
| 2014/0278387 A1* | 9/2014 | DiGregorio | G10L 15/20 704/231 |
| 2014/0282210 A1 | 9/2014 | Bianconi | |
| 2014/0288933 A1 | 9/2014 | Braho et al. | |
| 2014/0297058 A1 | 10/2014 | Barker et al. | |
| 2014/0299665 A1 | 10/2014 | Barber et al. | |
| 2014/0332590 A1 | 11/2014 | Wang et al. | |
| 2014/0351068 A1* | 11/2014 | Renfroe | G06Q 10/087 705/15 |
| 2014/0351317 A1 | 11/2014 | Smith et al. | |
| 2014/0362184 A1 | 12/2014 | Jovanovski et al. | |
| 2014/0363015 A1 | 12/2014 | Braho | |
| 2014/0369511 A1 | 12/2014 | Sheerin et al. | |
| 2014/0374483 A1 | 12/2014 | Lu | |
| 2014/0374485 A1 | 12/2014 | Xian et al. | |
| 2015/0001301 A1 | 1/2015 | Ouyang | |
| 2015/0009338 A1 | 1/2015 | Laffargue et al. | |
| 2015/0014416 A1 | 1/2015 | Kotlarsky et al. | |
| 2015/0021397 A1 | 1/2015 | Rueblinger et al. | |
| 2015/0028104 A1 | 1/2015 | Ma et al. | |
| 2015/0029002 A1 | 1/2015 | Yeakley et al. | |
| 2015/0032709 A1 | 1/2015 | Maloy et al. | |
| 2015/0039309 A1 | 2/2015 | Braho et al. | |
| 2015/0040378 A1 | 2/2015 | Saber et al. | |
| 2015/0049347 A1 | 2/2015 | Laffargue et al. | |
| 2015/0051992 A1 | 2/2015 | Smith | |
| 2015/0053769 A1 | 2/2015 | Thuries et al. | |
| 2015/0062366 A1 | 3/2015 | Liu et al. | |
| 2015/0063215 A1 | 3/2015 | Wang | |
| 2015/0088522 A1 | 3/2015 | Hendrickson et al. | |
| 2015/0096872 A1 | 4/2015 | Woodburn | |
| 2015/0100196 A1 | 4/2015 | Hollifield | |
| 2015/0115035 A1 | 4/2015 | Meier et al. | |
| 2015/0127791 A1 | 5/2015 | Kosecki et al. | |
| 2015/0128116 A1 | 5/2015 | Chen et al. | |
| 2015/0133047 A1 | 5/2015 | Smith et al. | |
| 2015/0134470 A1 | 5/2015 | Hejl et al. | |
| 2015/0136851 A1 | 5/2015 | Harding et al. | |
| 2015/0142492 A1 | 5/2015 | Kumar | |
| 2015/0144692 A1 | 5/2015 | Hejl | |
| 2015/0144698 A1 | 5/2015 | Teng et al. | |
| 2015/0149946 A1 | 5/2015 | Benos et al. | |
| 2015/0161429 A1 | 6/2015 | Xian | |
| 2015/0178523 A1 | 6/2015 | Gelay et al. | |
| 2015/0178537 A1 | 6/2015 | El et al. | |
| 2015/0178685 A1 | 6/2015 | Krumel et al. | |
| 2015/0181109 A1 | 6/2015 | Gillet et al. | |
| 2015/0186703 A1 | 7/2015 | Chen et al. | |
| 2015/0199957 A1 | 7/2015 | Funyak et al. | |
| 2015/0210199 A1 | 7/2015 | Payne | |
| 2015/0212565 A1 | 7/2015 | Murawski et al. | |
| 2015/0213647 A1 | 7/2015 | Laffargue et al. | |
| 2015/0220753 A1 | 8/2015 | Zhu et al. | |
| 2015/0220901 A1 | 8/2015 | Gomez et al. | |
| 2015/0227189 A1 | 8/2015 | Davis et al. | |
| 2015/0236984 A1 | 8/2015 | Sevier | |
| 2015/0239348 A1 | 8/2015 | Chamberlin | |
| 2015/0242658 A1 | 8/2015 | Nahill et al. | |
| 2015/0248572 A1 | 9/2015 | Soule et al. | |
| 2015/0254485 A1 | 9/2015 | Feng et al. | |
| 2015/0261643 A1 | 9/2015 | Caballero et al. | |
| 2015/0264624 A1 | 9/2015 | Wang et al. | |
| 2015/0268971 A1 | 9/2015 | Barten | |
| 2015/0269402 A1 | 9/2015 | Barber et al. | |
| 2015/0288689 A1 | 10/2015 | Todeschini et al. | |
| 2015/0288896 A1 | 10/2015 | Wang | |
| 2015/0310243 A1 | 10/2015 | Ackley | |
| 2015/0310244 A1 | 10/2015 | Xian et al. | |
| 2015/0310389 A1 | 10/2015 | Crimm et al. | |
| 2015/0312780 A1 | 10/2015 | Wang et al. | |
| 2015/0327012 A1 | 11/2015 | Bian et al. | |
| 2016/0014251 A1 | 1/2016 | Hejl | |
| 2016/0025697 A1 | 1/2016 | Alt et al. | |
| 2016/0026838 A1 | 1/2016 | Gillet et al. | |
| 2016/0026839 A1 | 1/2016 | Qu et al. | |
| 2016/0040982 A1 | 2/2016 | Li et al. | |
| 2016/0042241 A1 | 2/2016 | Todeschini | |
| 2016/0057230 A1 | 2/2016 | Todeschini et al. | |
| 2016/0062473 A1 | 3/2016 | Bouchat et al. | |
| 2016/0071190 A1 | 3/2016 | Voelz et al. | |
| 2016/0092805 A1* | 3/2016 | Geisler | G06Q 10/0633 705/7.27 |
| 2016/0101936 A1 | 4/2016 | Chamberlin | |
| 2016/0102975 A1 | 4/2016 | McCloskey et al. | |
| 2016/0104019 A1 | 4/2016 | Todeschini et al. | |
| 2016/0104274 A1 | 4/2016 | Jovanovski et al. | |
| 2016/0109219 A1 | 4/2016 | Ackley et al. | |
| 2016/0109220 A1 | 4/2016 | Laffargue | |
| 2016/0109224 A1 | 4/2016 | Thuries et al. | |
| 2016/0112631 A1 | 4/2016 | Ackley et al. | |
| 2016/0112643 A1 | 4/2016 | Laffargue et al. | |
| 2016/0117627 A1 | 4/2016 | Raj et al. | |
| 2016/0124516 A1 | 5/2016 | Schoon et al. | |
| 2016/0125217 A1 | 5/2016 | Todeschini | |
| 2016/0125342 A1 | 5/2016 | Miller et al. | |
| 2016/0133253 A1 | 5/2016 | Braho et al. | |
| 2016/0171597 A1 | 6/2016 | Todeschini | |
| 2016/0171666 A1 | 6/2016 | McCloskey | |
| 2016/0171720 A1 | 6/2016 | Todeschini | |
| 2016/0171775 A1 | 6/2016 | Todeschini et al. | |
| 2016/0171777 A1 | 6/2016 | Todeschini et al. | |
| 2016/0174674 A1 | 6/2016 | Oberpriller et al. | |
| 2016/0178479 A1 | 6/2016 | Goldsmith | |
| 2016/0178685 A1 | 6/2016 | Young et al. | |
| 2016/0178707 A1 | 6/2016 | Young et al. | |
| 2016/0179132 A1 | 6/2016 | Harr et al. | |
| 2016/0179143 A1 | 6/2016 | Bidwell et al. | |
| 2016/0179368 A1 | 6/2016 | Roeder | |
| 2016/0179378 A1 | 6/2016 | Kent et al. | |
| 2016/0180130 A1 | 6/2016 | Bremer | |
| 2016/0180133 A1 | 6/2016 | Oberpriller et al. | |
| 2016/0180136 A1 | 6/2016 | Meier et al. | |
| 2016/0180594 A1 | 6/2016 | Todeschini | |
| 2016/0180663 A1 | 6/2016 | McMahan et al. | |
| 2016/0180678 A1 | 6/2016 | Ackley et al. | |
| 2016/0180713 A1 | 6/2016 | Bernhardt et al. | |
| 2016/0185136 A1 | 6/2016 | Ng et al. | |
| 2016/0185291 A1 | 6/2016 | Chamberlin | |
| 2016/0186926 A1 | 6/2016 | Oberpriller et al. | |
| 2016/0188861 A1 | 6/2016 | Todeschini | |
| 2016/0188939 A1 | 6/2016 | Sailors et al. | |
| 2016/0188940 A1 | 6/2016 | Lu et al. | |
| 2016/0188941 A1 | 6/2016 | Todeschini et al. | |
| 2016/0188942 A1 | 6/2016 | Good et al. | |
| 2016/0188943 A1 | 6/2016 | Linwood | |
| 2016/0188944 A1 | 6/2016 | Wilz et al. | |
| 2016/0189076 A1 | 6/2016 | Mellott et al. | |
| 2016/0189087 A1 | 6/2016 | Morton et al. | |
| 2016/0189088 A1 | 6/2016 | Pecorari et al. | |
| 2016/0189092 A1* | 6/2016 | George | G06Q 10/087 705/28 |
| 2016/0189284 A1 | 6/2016 | Mellott et al. | |
| 2016/0189288 A1 | 6/2016 | Todeschini | |
| 2016/0189366 A1 | 6/2016 | Chamberlin et al. | |
| 2016/0189443 A1 | 6/2016 | Smith | |
| 2016/0189447 A1 | 6/2016 | Valenzuela | |
| 2016/0189489 A1 | 6/2016 | Au et al. | |
| 2016/0191684 A1 | 6/2016 | DiPiazza et al. | |
| 2016/0192051 A1 | 6/2016 | DiPiazza et al. | |
| 2016/0125873 A1 | 7/2016 | Braho et al. | |
| 2016/0202951 A1 | 7/2016 | Pike et al. | |
| 2016/0202958 A1 | 7/2016 | Zabel et al. | |
| 2016/0202959 A1 | 7/2016 | Doubleday et al. | |
| 2016/0203021 A1 | 7/2016 | Pike et al. | |
| 2016/0203429 A1 | 7/2016 | Mellott et al. | |
| 2016/0203797 A1 | 7/2016 | Pike et al. | |
| 2016/0203820 A1 | 7/2016 | Zabel et al. | |
| 2016/0204623 A1 | 7/2016 | Haggert et al. | |
| 2016/0204636 A1 | 7/2016 | Allen et al. | |
| 2016/0204638 A1 | 7/2016 | Miraglia et al. | |
| 2016/0316190 A1 | 7/2016 | McCloskey et al. | |

(56) References Cited

U.S. PATENT DOCUMENTS

| | | |
|---|---|---|
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0350787 A1* | 12/2016 | Taylor ............ G06Q 30/0223 |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0199266 A1 | 7/2017 | Rice et al. |
| 2017/0200108 A1 | 7/2017 | Au et al. |
| 2017/0200275 A1 | 7/2017 | McCloskey et al. |

OTHER PUBLICATIONS

Ackermann, Kenneth B., "Voice Recognition Systems Technology at Work in Today's Warehouse/Distribution Facilities," Prologis Supply Chain Review, Mar. 1, 2006, Denver, CO, retrieved from the Internet: URL: http://www.prologis.com/docs/research/supply chain/Voice_Recognition_System_-_March_2006.pdf, pp. 1-12 [Cited in EP Search Report].

Summons to Attend Oral Proceedings for European Application No. 18151536.2, dated Sep. 30, 2019, 2 pages.

Communication from the European Patent Office for Application No. 18151536.2, dated Mar. 10, 2020, 2 pages.

Communication pursuant to Article 94(3) for European Application No. 18151536.2, dated Mar. 1, 2019, 2 pages.

Communication pursuant to Rules 70(2) and 70a(2) for European Application No. 18151536.2, dated Jul. 23, 2018, 2 pages.

Examination Report in related European Application No. 18151536.2 dated Mar. 1, 2019, pp. 1-6 [Reference previously cited].

Annex to the communication dated Jan. 30, 2020 for EP Application No. 18151536.

Decision to Refuse a European Patent Application for 18151536.2, dated Apr. 14, 2020, 32 pages.

\* cited by examiner

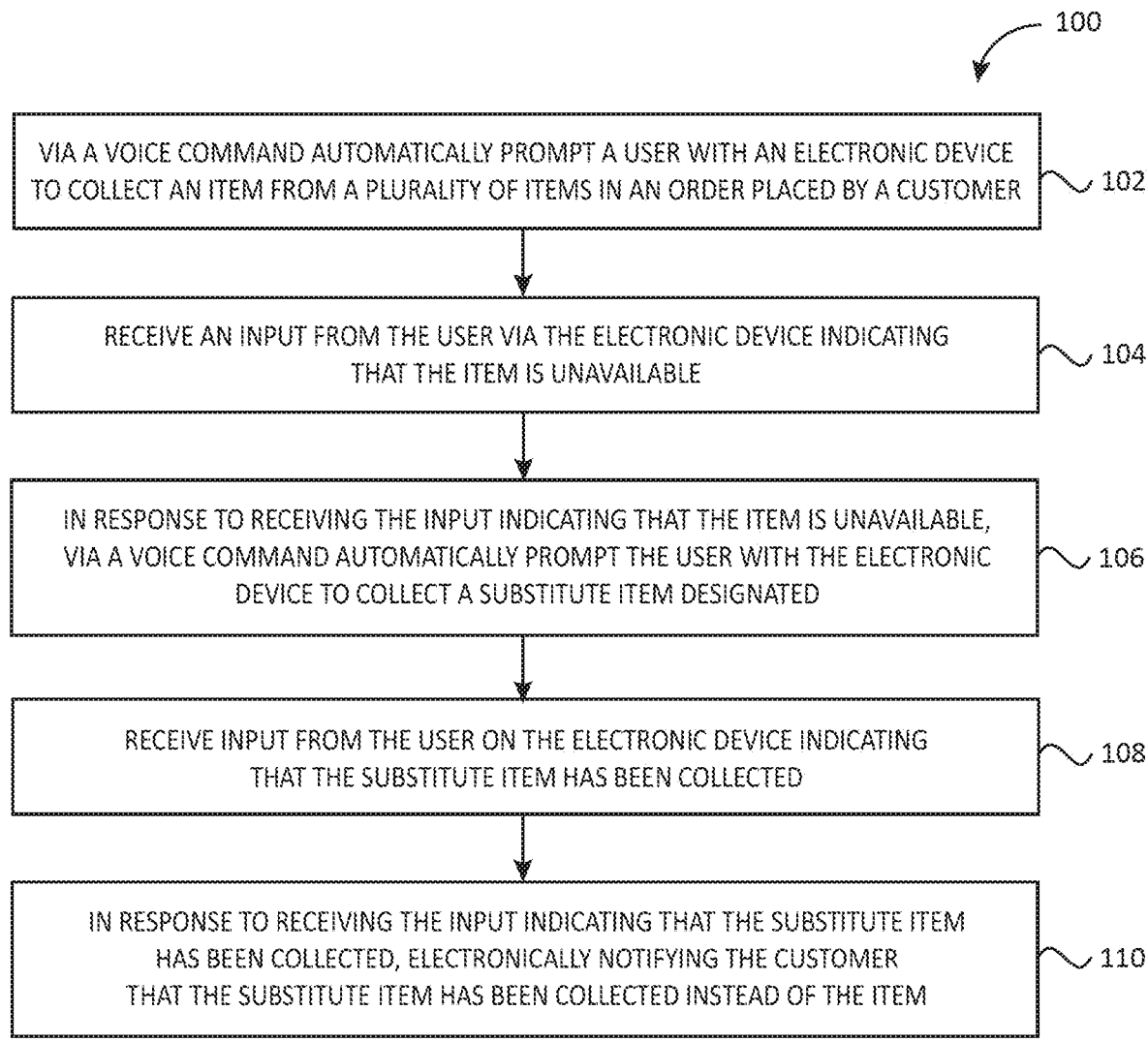

VOICE-ENABLED SUBSTITUTIONS WITH CUSTOMER NOTIFICATION

CROSS-REFERENCE TO RELATED APPLICATION

The present application claims the benefit of U.S. patent application Ser. No. 62/445,275 for Voice-Enable Substitutions with Customer Notification filed Jan. 12, 2017, which is hereby incorporated by reference in its entirety.

FIELD OF THE INVENTION

The present invention relates to picking systems, particularly picking systems using voice recognition.

BACKGROUND

Generally speaking, click-and-collect workflow is an emerging approach in retail industry. While offering multiple benefits of streamlining order fulfillment process, the approach is still lacking an easy way of keeping track and making on-the-fly corrections for shorted products, as well as providing non-invasive customer notification.

Therefore, a need exists for a method and system capable of accounting for incomplete item quantities, and efficiently addressing replacement options. One way to resolve such shortcoming includes implementing voice-enabled solutions in the click-and-collect workflow, with following automatic customer notification. Such an approach can not only speed up the order fulfillment process, but also improve the worker and customer satisfaction, thus leading to maximized sales and increased revenue.

SUMMARY

Accordingly, in one aspect, the present invention embraces a method to provide voice-enabled substitution of items in a customer order, followed by notifying the customer.

In an exemplary embodiment, a method to provide an order for a user to select goods includes automatically prompting a user via a voice command to collect an item from an order placed by a customer; receiving an input from the user via an electronic device indicating that the item is unavailable; automatically prompting the user via a voice command to collect a designated substitute item; receiving input from the user that the substitute item has been collected; and electronically notifying the customer that the substitute item has been collected instead of the original item.

In another aspect, the present invention embraces a voice-enabled click and collect system. According to an exemplary embodiment, the click and collect system includes a mobile device having a user input, and a remote server in communication with the mobile device. The remote server is configured to instruct the mobile device to prompt a user to collect an item, receive user input from the mobile device that the item is unavailable, instruct the mobile device to prompt the user to collect a substitute item, receive user input that the substitute item has been collected, and notify the customer that the substitute item has been collected.

In another exemplary embodiment, a click and collect system includes a remote server, and a mobile device having a user input. The mobile device is in communication with the remote server, and is configured to prompt a user to collect an item from a customer order, receive user input that the item is unavailable, communicate the item unavailability to the remote server, receive instructions from the remote server of a substitute item instead of the item, prompt the user to collect the substitute item, receive user input that the substitute item has been collected, and notify the customer the substitute item has been collected instead of the item.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 schematically depicts a method to provide an order for a user to select goods, according to an embodiment.

DETAILED DESCRIPTION

The present invention embraces methods and systems for voice-enabled substitutions with customer notification.

"Click-and-Collect" is an emerging offering in the retail industry, which may be implemented as an "Order Picking" workflow. In this workflow, a worker is guided through the store to pick products that a customer picked either electronically (web/app, etc.) or phoned in (and imported to the system via another workflow). Often, a product that the customer wants is not in stock or there are not enough on the shelf to fulfill the request. In typical cases, this item is skipped, because the worker does not know what to do. Additionally, the worker reports what was picked, but has no easy way of correcting a shorted product, or informing the customer. In other cases, the worker fills out a paper in which a call must be made to determine what the user wants. Such situations result in frustration for the worker who cannot get his/her job done efficiently. Such situations also result in frustration for the customer for either receiving a partial order or being annoyed by disruptive phone calls.

The present invention attempts to eliminate both of the above-described frustrations by providing the ability for the picking of substitutions via voice for the worker, and non-intrusive notification of the substitution for the customer. Moreover, the system will automatically direct the worker what to pick and in what sequence so that the quantity is filled in its entirety resulting in a satisfied customer and worker.

Particularly in retail settings, such a feature would be beneficial to both the customer and the worker. Current systems direct workers to pick orders in the most efficient way, but voice-enabled substitutions further increase efficiencies.

In exemplary systems, via voice, the system directs the worker to the location of the product and directs them to pick the requested quantity. The worker enters a quantity via voice or keyboard. At this point, the system knows if this is a shorted product (i.e., a product for which there is not enough stock on the shelf or at the store to fulfill the requested order). The system can then provide a list of substitutes (either generated by the most popular products based on data analysis and trends or by the customer via the original order). The system automatically directs the worker to pick the substituted products until that item is completely filled. Such a system provides a hassle-free process that takes the stress away from the worker and eliminates time delays. Moreover, by automatically notifying the customer electronically (via a message board that they signed up for or an e-mail), the customer knows exactly what they are going to get when they pick up their order.

The present invention allows the worker to get his job done in a timely manner without hesitation. It also eliminates the need to make disruptive phone calls. The present invention provides a cost savings to the employer as the employee gets his job done quicker due to the advantages of a voice solution. This workflow can be performed hands-free by the worker as a voice-enabled workflow. The voice-enabled solution has been designed to maximize ease-of-use and efficiency. Once a worker begins collecting an order, they can progress through the workflow entirely by voice in most cases, leaving their hands free and their attention focused on their work, rather than on a screen. Voice commands allow the worker to hear commands repeated, request more detailed information when necessary, and even pause their work while they assist a customer, all without touching their device.

The present invention may be implemented in a voice enabled order picking workflow solution. This exemplary workflow directs a worker to a location to pick each product. Once at the directed location, the worker is prompted via voice to enter the quantity picked for that product. If there is not enough product on the shelf, the quantity will be less than what was prompted. At this point, the worker will be directed to the highest priority substitute. Again, they will be asked to enter the quantity picked. If the desired quantity is still not fulfilled, they will be directed to go to the next substitution with the next highest priority. This will continue until the order is complete, at which time, the database will be updated with what was picked and the associated quantity.

This workflow can be done hands-free by the worker as a voice enabled workflow. As a voice enabled solution, numerous features make the app (i.e., an application/software running on a device) user-friendly and very easy to use. These include voice commands that allow the worker to repeat what they hear and easily navigate thru the workflow. Once the data is updated in the database, notification to the customer will be sent. In this way, the customer will have the ability to change the order. In any case, the customer will be pleased to know what they are picking up.

FIG. 1 shows a method 100 to provide an order for a user to select goods, according to an embodiment. At 102, a user with an electronic device is automatically prompted via a voice command to collect an item from a plurality of items in an order placed by a customer. At 104, an input is received from the user via the electronic device indicating that the item is unavailable. At 106, in response to receiving the input indicating that the item is unavailable, the user with the electronic device is automatically prompted via a voice command to collect a substitute item designated. At 108, input from the user is received on the electronic device indicating that the substitute item has been collected. At 110, in response to receiving the input indicating that the substitute item has been collected, the customer is electronically notified that the substitute item has been collected instead of the item.

In an embodiment, prompting a user at 102 can include presenting an identification of the item. The electronic device can include a microphone, keyboard, and/or touchscreen that receive input from the user. Additionally, the electronic device can include a speaker, display, and/or touchscreen that prompt the user. Additionally or alternatively, the electronic device can include a voice recognition headset having a microphone that receives the user input, and a speaker that outputs the user prompts. Electronically notifying the customer at 110 can include posting a message on a webpage, sending the customer an email, sending the customer a text message, and/or calling the customer via telephone. Additionally, the user can be automatically prompted to select the substitute item when the item is unavailable. The substitute item can be designated by the customer in the order, or identified by a remote server.

Another exemplary embodiment includes a click and collect system 200. The system 200 includes a mobile device 202 having a user input, and a remote server 204 in communication with the mobile device 202. The remote server 204 is configured to:

instruct the mobile device 202 to prompt a user to collect an item from a plurality of items in a customer order, receive user input from the mobile device 202 that the item is unavailable, in response to receiving the user input that the item is unavailable, instruct the mobile device 202 to prompt the user to collect a substitute item, receive user input from the mobile device 202 that the substitute item has been collected, and in response to receiving the user input that the substitute item has been collected, notify the customer that the substitute item has been collected instead of the item.

In an embodiment, the substitute item can be designated by the customer in the order, or identified by the remote server 204. The remote server 204 can be further configured to prompt the customer to confirm or change the order. Additionally or alternatively, the remote server 204 can be further configured to update a database at the remote server 204 with a list and quantities of items collected. The mobile device 202 can include a voice recognition headset having a microphone that receives the user input, and a speaker that outputs the user prompts. Notifying the customer can include one or more of: posting a message on a webpage, sending the customer an email, sending the customer a text message, and calling the customer via telephone.

Yet another exemplary embodiment includes a click and collect system 300. The system 300 includes a remote server 302, and a mobile device 304 having a user input. The mobile device 304 is in communication with the remote server 302 and is configured to:

prompt a user to collect an item from a plurality of items in a customer order, receive user input that the item is unavailable, in response to receiving the user input that the item is unavailable, communicate the item unavailability to the remote server 302, receive instructions from the remote server 302 of a substitute item instead of the item, prompt the user to collect the substitute item, receive user input that the substitute item has been collected, and in response to receiving the user input that the substitute item has been collected, notify the customer the substitute item has been collected instead of the item.

In an embodiment, the substitute item can be designated by the customer in the order, or identified by the remote server 302. The user input can include a microphone, keyboard, and/or touchscreen. The mobile device 304 can include a speaker, display, and/or touchscreen that prompt the user. The mobile device 304 can be a voice recognition headset having a microphone that receives the user input, and a speaker that outputs the user prompts. Notifying the customer can include one or more of: posting a message on a webpage, sending the customer an email, sending the customer a text message, and calling the customer via telephone.

Device and method components are meant to show only those specific details that are pertinent to understanding the embodiments of the present disclosure so as not to obscure the disclosure with details that will be readily apparent to those of ordinary skill in the art having the benefit of the description herein. In various embodiments, the sequence in which the elements of appear in exemplary embodiments disclosed herein may vary. Two or more method steps may be performed simultaneously or in a different order than the sequence in which the elements appear in the exemplary embodiments.

To supplement the present disclosure, this application incorporates entirely by reference the following commonly assigned patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; 8,740,082;
8,740,085; 8,746,563;
8,750,445; 8,752,766;
8,756,059; 8,757,495;
8,760,563; 8,763,909;
8,777,108; 8,777,109;
8,779,898; 8,781,520;
8,783,573; 8,789,757;
8,789,758; 8,789,759;
8,794,520; 8,794,522;
8,794,525; 8,794,526;
8,798,367; 8,807,431;
8,807,432; 8,820,630;
8,822,848; 8,824,692;
8,824,696; 8,842,849;
8,844,822; 8,844,823;
8,849,019; 8,851,383;
8,854,633; 8,866,963;
8,868,421; 8,868,519;
8,868,802; 8,868,803;
8,870,074; 8,879,639;
8,880,426; 8,881,983;
8,881,987; 8,903,172;
8,908,995; 8,910,870;
8,910,875; 8,914,290;
8,914,788; 8,915,439;
8,915,444; 8,916,789;
8,918,250; 8,918,564;
8,925,818; 8,939,374;
8,942,480; 8,944,313;
8,944,327; 8,944,332;
8,950,678; 8,967,468;
8,971,346; 8,976,030;
8,976,368; 8,978,981;
8,978,983; 8,978,984;
8,985,456; 8,985,457;
8,985,459; 8,985,461;
8,988,578; 8,988,590;
8,991,704; 8,996,194;
8,996,384; 9,002,641;
9,007,368; 9,010,641;
9,015,513; 9,016,576;
9,022,288; 9,030,964;
9,033,240; 9,033,242;
9,036,054; 9,037,344;
9,038,911; 9,038,915;
9,047,098; 9,047,359;
9,047,420; 9,047,525;
9,047,531; 9,053,055;
9,053,378; 9,053,380;
9,058,526; 9,064,165;
9,064,165; 9,064,167;
9,064,168; 9,064,254;
9,066,032; 9,070,032;
9,076,459; 9,079,423;
9,080,856; 9,082,023;
9,082,031; 9,084,032;
9,087,250; 9,092,681;
9,092,682; 9,092,683;
9,093,141; 9,098,763;
9,104,929; 9,104,934;
9,107,484; 9,111,159;
9,111,166; 9,135,483;
9,137,009; 9,141,839;
9,147,096; 9,148,474;
9,158,000; 9,158,340;
9,158,953; 9,159,059;
9,165,174; 9,171,543;

9,183,425; 9,189,669;
9,195,844; 9,202,458;
9,208,366; 9,208,367;
9,219,836; 9,224,024;
9,224,027; 9,230,140;
9,235,553; 9,239,950;
9,245,492; 9,248,640;
9,250,652; 9,250,712;
9,251,411; 9,258,033;
9,262,633; 9,262,660;
9,262,662; 9,269,036;
9,270,782; 9,274,812;
9,275,388; 9,277,668;
9,280,693; 9,286,496;
9,298,964; 9,301,427;
9,313,377; 9,317,037;
9,319,548; 9,342,723;
9,361,882; 9,365,381;
9,373,018; 9,375,945;
9,378,403; 9,383,848;
9,384,374; 9,390,304;
9,390,596; 9,411,386;
9,412,242; 9,418,269;
9,418,270; 9,465,967;
9,423,318; 9,424,454;
9,436,860; 9,443,123;
9,443,222; 9,454,689;
9,464,885; 9,465,967;
9,478,983; 9,481,186;
9,487,113; 9,488,986;
9,489,782; 9,490,540;
9,491,729; 9,497,092;
9,507,974; 9,519,814;
9,521,331; 9,530,038;
9,572,901; 9,558,386;
9,606,581; 9,646,189;
9,646,191; 9,652,648;
9,652,653; 9,656,487;
9,659,198; 9,680,282;
9,697,401; 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;

U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;

U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method to provide a voice-enabled substitution of items in an order, comprising:
    prompting a user, via a first voice command from an electronic device, to collect an item in an order placed by a customer, wherein the first voice command also indicates a quantity of the item to be picked;
    directing the user to pick the quantity of the item as prompted in an ordered sequence;
    in response to the user picking the item, prompting the user via a second voice command to enter via at least one of a voice input or a keyboard input, a quantity of item picked;
    receiving an input from the user entering the quantity of item picked via the electronic device;
    determining if the quantity of the item prompted matches the quantity of item picked by the user;
    in response to determining that the quantity of the item prompted is less than the quantity of the item picked, determining that the item is unavailable;
    in response to determining that the item is unavailable, prompting the user via a third voice command from the electronic device, to collect a first substitute item, the prompting comprising:
        analyzing, by a remote server, data pertaining to a trends associated with each item of a list of items and a popularity of each item of the list of items, to determine a list of related items to each item of the list of items, and identifying, by the remote server, the first substitute item as having a highest popularity in the list of related items;
prompting the user, via a fourth voice command from the electronic device, to enter a quantity of the first substitute item picked;
determining if the quantity of the item prompted matches with a first total quantity of item picked by the user, wherein the first total quantity of item picked comprises the quantity of item picked and the quantity of the first substitute item picked;
in response to determining that the quantity of the item prompted is less than the first total quantity of item picked, prompting the user, via a fifth voice command from the electronic device, to collect a second substitute item having a second highest priority in the list of related items;
receiving input from the user on the electronic device indicating that the second substitute item has been collected;
determining if the quantity of the item prompted matches with a second total quantity of item picked by the user, wherein the second total quantity of item picked comprises the quantity of item picked, the quantity of the first substitute item picked, and a quantity of the second substitute item picked;
determining that the order placed by the customer is completed when the quantity of the item prompted matches with the second total quantity of item picked; and
in response to determining that the order placed by the customer is completed, updating a database located at a remote server with the first substitute item, the second substitute item, the quantity of the first substitute item and the quantity of the second substitute item; and
in response to the database being updated, electronically notifying the customer in real-time that the first substitute item and the second substitute item have been collected instead of the item in the order placed by the customer and the customer can, in real time, accept or reject the order comprising the first substitute item and the second substitute item, or suggest alternate substitute items.

2. The method of claim 1, wherein prompting the user includes presenting an identification of the item.

3. The method of claim 1, wherein the electronic device comprises a microphone, keyboard, and/or touchscreen that receives input from the user.

4. The method of claim 3, wherein the electronic device comprises a speaker, display, and/or touchscreen that prompts the user.

5. The method of claim 1, wherein electronically notifying the customer comprises:
posting a message on a webpage;
sending the customer an email;
sending the customer a text message; and/or
calling the customer via telephone.

6. The method of claim 1, wherein the electronic device is a voice recognition headset having a microphone that receives the user input, and a speaker that outputs the user prompts.

7. The method of claim 1, further comprising:
prompting the customer to confirm or change the order.

8. The method of claim 1, wherein the first substitute item or the second substitute item is:
designated by the customer in the order, or
identified by the remote server.

9. A voice-enabled substitution system comprising:
a mobile device comprising a user input; and
a remote server in communication with the mobile device, the remote server configured to:
instruct the mobile device to prompt a user to collect an item in a customer order, wherein the prompt to the user to collect the item also indicates a quantity of the item to pick in an ordered sequence,
in response to the user picking the item, instruct the mobile device to prompt the user to enter via the user input, a quantity of item picked,
receive user input from the mobile device in response to the user entering the quantity of item picked,
determine if the quantity of the item prompted matches the quantity of item picked by the user,
in response to determining that the quantity of the item prompted is less than the quantity of item picked, determine that the item is unavailable,
in response the determination that the item is unavailable, instruct the mobile device to prompt the user to collect a first substitute item, the prompt comprises:
analyze data pertaining to a trends associated with each item of a list of items and a popularity of each item of the list of items, to determine a list of related items to each item of the list of items, and identify the first substitute item as having a highest popularity in the list of related items,
instruct the mobile device to prompt the user to enter a quantity of the first substitute item picked,
determine if the quantity of item prompted matches with a first total quantity of item picked by the user, wherein the first total quantity of item picked comprises the quantity of item picked and the quantity of the first substitute item picked,
in response to determining that the quantity of the item prompted is less than the first total quantity of item picked, instruct the mobile device to prompt the user to collect a second substitute item instead of the item, wherein the second substitute item has a second highest priority in the list of related items,
receive user input from the mobile device indicating a quantity of the second substitute item picked,
determine if the quantity of the item prompted matches with a second total quantity of item picked by the user, wherein the second total quantity of item picked comprises the quantity of item picked, the quantity of the first substitute item picked, and a quantity of the second substitute item picked,
determine that the customer order is completed when the quantity of the item prompted matches with the second total quantity of item picked,
in response to determining that the customer order is completed, update a database located at the remote server, with the first substitute item, the second substitute item, the quantity of the first substitute item and the quantity of the second substitute item, and
in response to the database being updated, notify a customer in real-time that the first substitute item and the second substitute item have been collected instead of the item ordered in the customer order and the customer can, in real time, accept or reject the customer order comprising the first substitute item and the second substitute item, or suggest alternate substitute items.

10. The system of claim 9, wherein the first substitute item or the second substitute item is:

designated by the customer in the customer order, or identified by the remote server.

11. The system of claim 9, wherein the remote server is further configured to prompt the customer to confirm or change the customer order.

12. The system of claim 9, wherein the remote server is further configured to update the database at the remote server with a list and quantities of items collected.

13. The system of claim 9, wherein the mobile device is a voice recognition headset having a microphone that receives the user input, and a speaker that outputs the user prompts.

14. The system of claim 9, wherein notifying the customer includes one or more of:
- posting a message on a webpage;
- sending the customer an email;
- sending the customer a text message; and
- calling the customer via telephone.

15. A click and collect system, comprising:
- a remote server;
- a mobile device comprising a user input, the mobile device being in communication with the remote server and being configured to:
  - prompt a user to collect an item in an order placed by a customer, wherein the prompt to the user to collect the item also indicates a quantity of the item to pick,
  - direct the user to pick the item as prompted in an ordered sequence,
  - in response to the user picking the item, prompt the user to enter via the user input a quantity of item picked,
  - receive user input in response to the user entering the quantity of item picked,
  - determine if the quantity of the item prompted matches the quantity of item picked by the user,
  - in response to determining that the quantity of item prompted is less than the quantity of item picked, determine that the item is unavailable,
  - in response to the determination that the item is unavailable, communicate the item unavailability to the remote server and prompt the user to collect a first substitute item, the remote server is configured to:
    - analyze data pertaining to a trends associated with each item of a list of items and a popularity of each item of the list of items, to determine a list of related items to each item of the list of items, and identify the first substitute item as having a highest popularity in the list of related items;
  - receive instructions from the remote server of the first substitute item instead of the item,
  - prompt the user to enter a quantity of the first substitute item picked;
  - determine if the quantity of item prompted matches with a first total quantity of item picked by the user, wherein the first total quantity of item picked comprises the quantity of item picked and the quantity of the first substitute item picked,
  - in response to determining that the quantity of the item prompted is less than the first total quantity of item picked, receive instructions from the remote server of a second substitute item instead of the item, wherein the second substitute item has a second highest priority in the list of related items,
  - prompt the user to collect the second substitute item,
  - receive user input indicating a quantity of the second substitute item picked,
  - determine if the quantity of the item prompted matches with a second total quantity of item picked by the user, wherein the second total quantity of item picked comprises the quantity of item picked, the quantity of the first substitute item picked and the quantity of the second substitute item picked;
  - determine that the order placed by the customer is completed when the quantity of the item prompted matches with the second total quantity of item picked;
  - in response to determining that the order placed by the customer is completed, update a database located at the remote server with the first substitute item, the second substitute item, the quantity of the first substitute item and the quantity of the second substitute item; and
  - in response to the database being updated, notify the customer in real-time that the first substitute item and the second substitute item have been collected instead of the item in the order placed by the customer and the customer can, in real time, accept or reject the order comprising the first substitute item and the second substitute item, or suggest alternate substitute items.

16. The system of claim 15, wherein the first substitute item or the second substitute item is:
- designated by the customer in the order, or
- identified by the remote server.

17. The system of claim 15, wherein the user input includes a microphone, keyboard, and/or touchscreen.

18. The system of claim 15, wherein the mobile device includes a speaker, display, and/or touchscreen that prompts the user.

19. The system of claim 15, wherein the mobile device is a voice recognition headset having a microphone that receives the user input, and a speaker that outputs the user prompts.

20. The system of claim 15, wherein notifying the customer includes one or more of:
- posting a message on a webpage;
- sending the customer an email;
- sending the customer a text message; and
- calling the customer via telephone.

* * * * *